# 2,885,307

DELAYED TACK ADHESIVE COMPRISING 1,2-BIS (4-TERT.BUTYL 2-CHLOROPHENOXY)ETHANE

Raymond H. Rigterink, Richard Lynn Miller, Jr., and Lloyd H. Silvernail, Midland, Mich., assignors to The Dow Chemical Company, Midland, Mich., a corporation of Delaware No Drawing. Application January 11, 1956
Serial No. 558,416

1 Claim. (Cl. 117—122)

This invention relates to a coating for paper and other flexible sheets which is non-tacky and non-blocking at normal temperatures as first produced, but which responds to a brief heat treatment by becoming tacky and pressure-sensitive at room temperature and by retaining the so-activated attributes for a useful period of time.

It has been disclosed heretofore, in U.S. Patent, 2,462,-029 and British specification 624,620 of Nashua Gummed and Coated Paper Company, that delayed tack adhesives of the type here concerned are obtained when there is applied to a surface an aqueous dispersion having the following characteristics. The dispersion contains intimately mixed discrete particles of a heat-sensitive resin or polymer and fine particles of a solid, crystalline material which becomes a plasticizer for the resin particles when both the resin and plasticizer are melted together. When such a dispersion is applied to paper, cellophane, cloth or other surface, and the coated surface is dried carefully so as not to melt the potential plasticizer, the dried coated surface has no tack at room temperature. When the dried coating is heated to melt the plasticizer, the latter blends with and softens the resin or polymer and renders the coating tacky and pressure sensitive. The tackiness persists for a short time even when the coating is cooled to temperatures lower than those required to initiate tackiness in the original dry coating. For such uses as in labels or the sealing areas of wrapping sheets, it is generally satisfactory for the adhesive to show a tack life of 10 minutes after it is activated by heat before it loses its pressure-sensitive character.

Numerous polymeric, resinous or other thermoplastic film forming constituents have been proposed for use in such compositions, but the ones which have proven most acceptable have been the interpolymerization products of from about 30 to 75 percent butadiene and correspondingly from about 70 to 25 percent of styrene. Similarly, many crystalline plasticizers have been proposed, but the one which has proven most satisfactory heretofore and which has been used in the commercial exploitation of the process is tri(p-tert.butylphenyl)phosphate. The other previously suggested plasticizers, of somewhat lesser utility, include diphenyl phthalate, polychlorodiphenyl, and cyclohexyl p-toluene sulfonamide.

A superior plasticizer for the styrene-butadiene interpolymers is much to be desired, and it is the principal object of this invention to provide an improved delayed tack adhesive composition containing an especially advantageous and heretofore unsuggested crystalline plasticizer.

The improved adhesive of the present invention is a normally solid, visually homogeneous film which is non-tacky and non-blocking at room temperature, and which is activatable by heat to a tacky, pressure-sensitive state which persists for several minutes on cooling, comprising as the essential constituents an amorphous, normally solid and non-tacky film-forming interpolymerization product of from about 40 to 75 percent butadiene and correspondingly from about 60 to 25 percent styrene intimately and uniformly admixed with discrete crystalline particles of 1,2-bis(4-tert.butyl 2-chlorophenoxy)ethane (M.P. 105°–107° C.) in proportion to provide after heating a tacky composition.

The proportion of the named plasticizer relative to the butadiene-styrene copolymer which is necessary to give a tacky composition when the two are merged by heating varies according to the properties of the particular butadiene-styrene interpolymerization product employed. Thus, such an interpolymer containing as much as 60 percent styrene requires more plasticizer to create a tacky composition than does one containing as little as 25 percent styrene, balance butadiene. The desired degree of tackiness is developed in all such systems with a ratio of from 50 to 80 parts of plasticizer by weight for correspondingly from 50 to 20 parts of the interpolymer.

The new compositions are applied from aqueous dispersions, in which neither the plasticizer nor the interpolymer is soluble. Most commonly, the dispersions are made by first preparing an aqueous plasticizer dispersion and then mixing this with a latex or aqueous emulsion polymerisate of the interpolymer.

Typically, the plasticizer concentrate is prepared by grinding the plasticizer crystals in a ball mill with water containing a small amount of an emulsifier. It is convenient to incorporate in this mixture a small amount of casein or other hydrophilic colloid to thicken the dispersion and possibly to aid in binding the polymeric solids and plasticizer to the surface to be coated while the solids are maintained in their initial physically independent form.

In a representative example, a mixture of

| | Parts by weight |
|---|---|
| Water | 200 |
| 1,2-bis(4-tert.butyl 2-chlorophenoxy)ethane | 100 |
| Emulsifier | 0.5 |
| Casein | 5.0 | was ground in a ball mill at room temperature for 24 hours. The resulting plasticizer dispersion was blended with an emulsion polymerisate of 60 percent styrene–40-percent butadiene of 48 percent solids concentration, and thickened with a minor amount of water-soluble polyacrylic acid, to provide a final coating composition having the following composition:

| | Parts by weight |
|---|---|
| Styrene-butadiene interpolymer solids | 40 |
| Plasticizer | 60 |
| Casein | 3 |
| Polyacrylic acid (dry basis) | 1 |
| Water | 163 |

The composition was doctored onto paper at 10 pounds dry basis per ream, and the coated paper was dried in air at 30° C. When dry, the coated sheets were non-tacky and non-blocking at any temperature likely to be encountered in normal storage or shipment. When, however, the coated sheet was heated briefly to melt the plasticizer, the coating became very tacky and adhesive, and remained usefully so at room temperature for about 15 minutes. This coating, in all respects, is among the best delayed tack adhesives. In the new compositions the present plasticizer produces results which have heretofore been obtained only with tri(p-tert.butylphenyl)phosphate (M.P. 103°–105° C.), and is superior to one in which the plasticizer is diphenyl phthalate (M.P. 73°–75° C.). Several compounds having structures similar to that of 1,2-bis(4-tert.butyl 2-chlorophenoxy)ethane were tested in the same manner, and it was found that neither 1,2-diphenoxy ethane nor 1,2-bis(4-tert.butylphenoxy)ethane was satisfactory, as these both gave compositions which were only tacky when hot and lost their tackiness within a few seconds after cooling.

Other compositions were prepared in which the film forming interpolymer was one containing from 70 to 25 parts by weight of styrene and correspondingly from 30 to 75 parts of butadiene, and in which the amounts of 1,2-bis(4-tert.butyl 2-chlorophenoxy)ethane was varied from 80 to 50 parts by weight for correspondingly from 20 to 50 parts of the interpolymer. All of these showed useful delayed tack properties when coated, as described, on paper, cellophane, cloth and other surfaces, such as the under surface of wood veneer. The degree of tack, when using any particular interpolymer, was proportional to the amount of the plasticizer present, while the degree of tack, when using a fixed proportion of the plasticizer and varying the interpolymer was roughly proportional to the amount of butadiene in the interpolymer.

There may be, and usually will be other constituents in the compositions besides the plasticizer and interpolymer. Thus, water-sensitive binders and thickeners have been suggested. Additionally, there may be various resins and stabilizers chosen and used for their known and desired effects on the interpolymer coating. Such added agents are well known in the art and form no part of the present specific invention.

We claim:

As an article of manufacture, a sheet of paper bearing a normally solid and visually homogeneous coating, non-tacky at room temperature and capable of being activated by heat to a tacky and adhesive state which persists for several minutes after cooling to room temperature, the essential constituents of which are an interpolymerization product of from 30 to 75 percent butadiene and correspondingly from 70 to 25 percent styrene, and from 50 to 80 parts by weight of discrete crystalline particles of 1,2-bis(4-tert.butyl 2-chlorophenoxy)ethane for correspondingly each 50 to 20 parts of said interpolymer.

References Cited in the file of this patent

UNITED STATES PATENTS

| | | |
|---|---|---|
| 2,130,990 | Coleman et al. | Sept. 20, 1938 |
| 2,329,033 | Britton et al. | Sept. 7, 1943 |
| 2,462,029 | Perry | Feb. 15, 1949 |